Aug. 7, 1923.
P. HEYLANDT
DEVICE FOR SUPPLYING OXYGEN
Filed Jan. 3, 1921
1,464,319
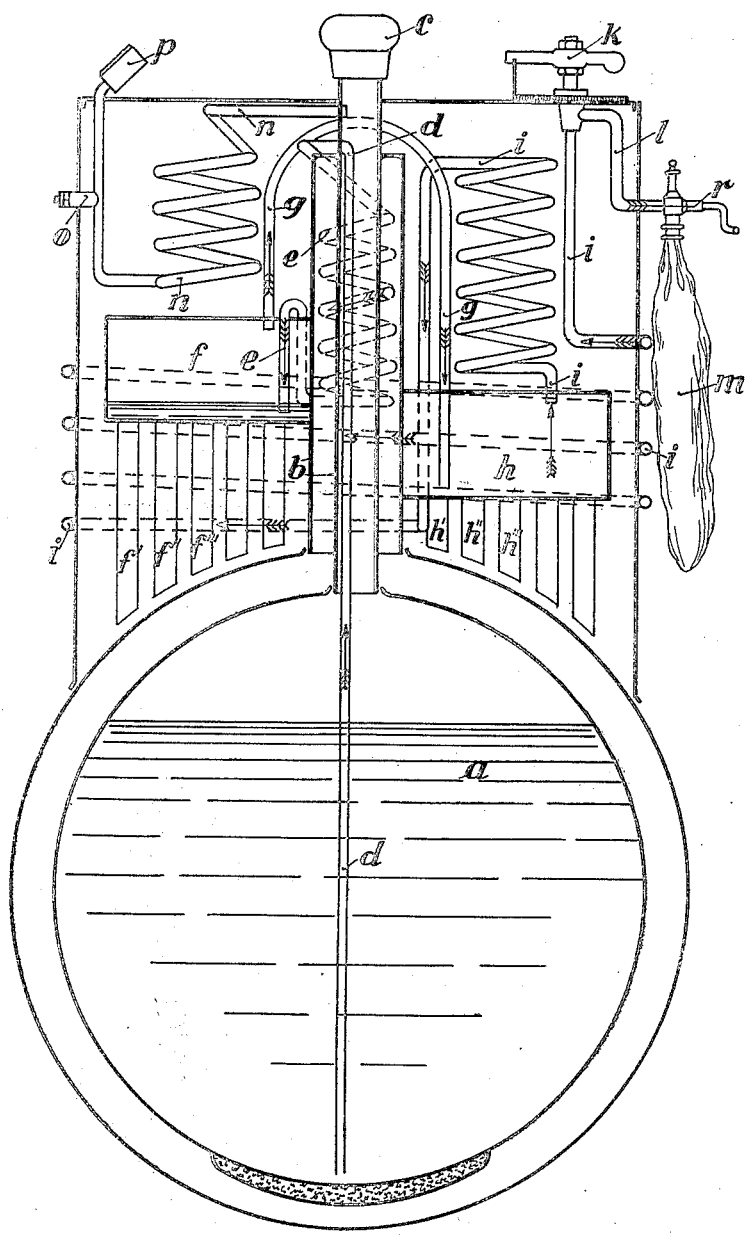
INVENTOR:
Paul Heylandt
BY Wm Wallace White
ATT'Y.

Patented Aug. 7, 1923.

1,464,319

UNITED STATES PATENT OFFICE.

PAUL HEYLANDT, OF SUDENDE, NEAR BERLIN, GERMANY.

DEVICE FOR SUPPLYING OXYGEN.

Application filed January 3, 1921. Serial No. 434,824.

(GRANTED UNDER THE PROVISIONS OF THE ACT OF MARCH 3, 1921, 41 STAT. L., 1313.)

*To all whom it may concern:*

Be it known that I, PAUL HEYLANDT, a citizen of the German Republic, residing at Sudende, near Berlin, Germany, have invented certain new and useful Improvements in Devices for Supplying Oxygen, for which applications for patent have been filed in Germany, December 1, 1916, and November 2, 1917; Sweden, on June 26, 1919; Norway, on June 28, 1919; and Great Britain, on July 12, 1920, and of which the following is a specification.

It is well known that when an aircraft rises higher than 4000 metres the physical efficiency of the crew is greately diminished by the want of oxygen. Similarly the power of the motor is also reduced by the scarceness of oxygen in the rarefied air, the mechanical output being diminished according to the altitude, and sinking to as much as one half of the power obtained on the ground. The fact that the deficiency of oxygen affects both the crew and the motors is in itself a suggestion that means should be provided for enabling aircraft to take along with them a sufficient quantity of oxygen for both purposes.

An outfit for enabling the aircraft to take along oxygen gas that is compressed in steel receptacles to a pressure of 150 atmospheres is quite out of the question, because a steel bottle whose own weight is 75 to 80 kgs. only contains 6 cubic metres or 8.4 kgs. of oxygen. Therefore, if the quantity of oxygen gas required on the aircraft were 25 to 100 cubic metres the dead weight of the bottles amounting to 300 to 1200 kgs. would have to be taken along and this would be impossible not only for an aeroplane, but also for a large airship.

Hence the oxygen has to be conveyed in a liquid state and the net weight of the vessel used for carrying the liquid oxygen must be very small. But in addition to this, a process for giving off oxygen must be applied which is extremely economical in operation and which only gives out a little oxygen at small heights but which gives out the more oxygen the more the air pressure drops at greater altitudes. This giving out of varying quantities of oxygen must take place automatically without continually readjusting or regulating the apparatus. An excellent solution of this problem is presented by the present invention:

The process employed in accordance with the invention consists in continually keeping the liquid oxygen in the carrying vessel under a certain uniform superpressure and thus giving rise to a difference between the pressure upon the liquid oxygen and the atmospheric pressure. The means used for obtaining this difference of pressures consists in a specially adapted valve, or more specifically, a kind of safety valve. The said difference of pressure grows larger when the aircraft rises to greater altitudes and becomes smaller when it sinks to smaller heights. Hence the difference of pressure changes automatically, and in accordance with the invention, the reduced pressure of the atmosphere in the higher regions and its increased pressure in lower regions is utilized for automatically regulating the amount of oxygen given off.

The liquid oxygen is cut off from the outer air by a throttling valve so as to prevent the acceleration and retardation of the boiling of the oxygen when the aeroplane ascends and decends respectively, because if the surface of liquid oxygen were in direct contact with the atmosphere, or in indirect communication with it through coiled pipes or other interposed apparatus, the decrease of the atmospheric pressure during an ascent would immediately cause a great acceleration of the boiling of the oxygen, and the result would be that in ascending more liquid oxygen would evaporate, i. e. more oxygen gas would be developed, than is required. At the same time the liquid oxygen would cool down to the lower boiling point which corresponds to the lower pressure. Inversely, during a descent, or, in other words, when the atmospheric pressure increases, a retardation in the boiling of the oxygen takes place, which is so considerable that not only does the giving off of oxygen cease, but the air of the atmosphere is even drawn into the apparatus and condensed in the undercooled liquid. This drawback of the boiling of the oxygen being retarded or accelerated is removed by the throttling valve.

In addition to the said valve the receptacle for liquid oxygen is equipped with coiled pipes and other devices in which the liquid oxygen evaporates and is brought up to the temperature of the surrounding air. The throttling valve is preferably placed adjacent to the outlet of the warmed oxygen gas so that the throttled gas occupies the whole length of the passages of the apparatus up to the throttling valve that cuts it off from the atmosphere. In addition to the warming effect of the said passages the oxygen for the motor may be preheated in a coiled pipe wound round the motor exhaust.

It is thus seen that the afore-mentioned process is designed to automatically and completely adapt itself to the shortage of oxygen that varies as the altitudes, so that it is very economical in operation. Hence this process renders it possible to supply just the amount of oxygen in which the air of the atmosphere is deficient.

The quantity of liquid oxygen required for the respiration of the crew of the aircraft per man and hour amounts to as much as $\frac{3}{4}$ of a litre. To increase the power of the aircraft motors by supplying them with oxygen, experiments were carried out after previous calculations. By these experiments it has been found that with the aid of the process according to this invention the mechanical output of the motor can be increased to almost its normal figure, and that the weight of the liquid oxygen required can be carried by the aircraft without any overloading:

A Mercedes motor that develops 160 horse power at ground level only gives 89.5 horse power at an altitude of 6000 metres above the earth's surface on account of the deficiency of oxygen at this height. If 33 per cent of the lacking quantity of oxygen is supplied to the motor in accordance with the process of this invention the output of the motor is increased to 116 horsepower and if 50% of the deficient oxygen is supplied the motor output rises to 130 h. p. Hence by supplying additional oxygen 26 or 40 h. p. is gained, and to accomplish this 24.7 or 33.3 kgs. respectively of oxygen is required per hour. But the total amount consumed during the whole flight is still smaller, because the aircraft is not continually at a height of 6000 metres and an initial period of 20 to 30 minutes for the ascent and about 15 minutes for the gliding period have to be deducted.

If the vessels used for carrying the oxygen are the extremely light and well insulated vessels of the Heylandt type, it is possible to convey 37 kgs. of liquid oxygen in a vessel weighing 12 kgs. This quantity of 37 kgs. of oxygen is sufficient to supply a deficiency of 50% of oxygen for almost 2 hours of working. Hence at the start the aeroplane would have to carry a surplus load of 37 plus 12 kgs.=49 kgs., and as oxygen is consumed during the flight the average surplus load will only amount to $$\frac{37}{2}+12=30.5 \text{ kgs.}$$

The increase of output of the motor at an altitude of 6000 metres, and when 50% of the deficient oxygen is replenished, then amounts to 130−89.5=40.5 h. p. The extra power required for the carriage of the extra average weight of 30.5 kgs. is $$\frac{30.5}{5}=6.1 \text{ h.p.}$$

so that the actual increase of output is 34.4 h. p. This increase of output may be utilized for putting the aeroplane up to a greater height or for increasing its speed.

The process according to the invention may be used in all cases where it is necessary for the amount of the oxygen gas produced to be varied automatically as the working pressure changes. Hence this process is not only adapted for use in aircraft, but also for fire brigades and hospitals.

For the practical application of the invention light vessels are required which are capable of holding comparatively large quantities of liquid oxygen. In the present state of the art, the most suitable vessels for this purpose are the well known double-walled, evacuated, metal vessels of the Heylandt type whose vacuum is maintained by an air-absorbing substance, and which are described in the United States Patent No. 1,033,398. For the purposes of this invention these vessels are provided with a siphon pipe that extends almost to the bottom of the vessel. When the vessel has been filled with liquid oxygen it is closed, and the oxygen gas that then gradually evaporates and exerts a pressure on the enclosed liquid oxygen presses this latter up and out of the siphon pipe. This ejected liquid oxygen is then evaporated by the warmth of the surrounding atmosphere and either inhaled in a gaseous state or conducted into a motor. The novel feature of the present invention is the following: The liquid oxygen pressed out of the vessel is first vaporized in a system of small evaporating vessels and coiled tubes, and warmed up to the temperature of the surrounding air. During this action a constant superpressure is maintained both in the vessel and in the coiled pipes and evaporating vessels, because the safety valve of the vessel is regulated for a certain superpressure. This super-pressure urges the oxygen gas through a throttling valve arranged at the end of a tortuous exit passage, the throttling valve allowing more gas to pass out as the difference between the super-pressure in the vessel and atmospheric pressure decreases. If, for example, the superpressure in the vessel is 0.2 atmosphere so that the total pressure is 1.2 atmospheres, the throttling valve will keep the said superpressure the same, even when the aeroplane ascends to high altitudes. At an altitude of 7500 to 8000 metres the air pressure is only about 0.3 atmospheres, at 6000 ms. it is about 0.5 and at the level of the ground the external atmospheric pressure is generally 1 atmosphere. Thus the differences between the pressure in the vessel and the external atmospheric pressure in the said three examples is 1.2—0.3=0.9, and 1.2—0.5=0.7, and 1.2—1.0=0.2 atmospheres respectively. This variation of the difference of pressure will, if the valve is constantly kept opened to the same extent, cause different quantities of gas to pass out through the valve, and the arrangement according to the invention is such that these quantities are proportional to the lack of oxygen at the various altitudes. Thus at whatever height the airman might happen to be, he will always receive the quantity of oxygen he requires. Therefore the valve is only set once, before the aerial trip is commenced, for the quantity of oxygen required for respiration and for the boosting of the motor output at an average altitude of about 5000 metres. When this has been done the valve will let a larger amount of gas pass out at greater heights where there is less oxygen and a smaller amount at lesser altitudes where there is more oxygen.

A constructional form of a device for carrying out the invention is diagrammatically shown in the drawing.

In this a double-walled, ball-shaped metal vessel of the Heylandt type, with a vacuum between the two walls, and oxygen $a$ in the interior vessel, is illustrated. After the oxygen has been filled into the vessel $b$ it is closed with a cap $c$. In consequence of the pressure exerted by the evaporated oxygen the liquid oxygen is pressed up out of the flask through the ascension pipe $d$. The ascension pipe is first wound in the form of a helix in the evacuated space around the neck of the inner flask and is then connected by a pipe $e$ to an evaporating vessel $f$ which is equipped with a number of pipes $f'$, $f''$, $f'''$ that serves to enlarge the surface of the evaporating vessel and to accelerate evaporation. During its passage through the evaporating vessel most of the oxygen is evaporated and it then passes through the pipe $g$ into a second evaporating vessel $h$, which also has several pipes $h'$, $h''$, $h'''$ attached to it. After the liquid oxygen is completely evaporated in this way the cold oxygen gas evolved from it is conducted through a long coil $i$ the first part of which is located inside the apparatus and whose remainder passes round the exterior protective envelope and ultimately leads up to the valve $k$, which is a throttling valve. The entire length of the described passages is such that the oxygen is warmed up to the temperature of the atmosphere. The arrangement of the valve $k$ is such that it can be set so as to deliver various quantities of oxygen gas. It is detained in its position by a spring that engages with the notches of a toothed wheel. The various quantities of oxygen are indicated by figures on the wheel. After passing the valve $k$, the oxygen flows through a pipe $l$ into a bag $m$ made of a gummed fabric and thence to the discharge pipe $r$ to which the pipes are connected that lead to the points of consumption. The bag $m$ evens out inequalities in the quantities of oxygen consumed.

In addition to the system of pipes through which the oxygen passes, first in a liquid and then in a gaseous state, to the supply pipe $l$, a separate pipe $n$ is provided which leads to the safety valve $o$ and the pressure gauge $p$. The pipe $n$ is also coiled for the purpose of warming the oxygen and its sole function is to cause the superpressure to be indicated by the pressure gauge and to allow the surplus oxygen to escape when the pressure becomes too great.

If the apparatus is merely to supply oxygen for breathing purposes its contents on an aeroplane will amount 1.5 to 6 litres according to the length of the trip. On an airship the corresponding quantities will be 10 to 50 litres. But if the motor is also to be supplied with oxygen, in order to restore its power at high altitudes, several vessels of a capacity of 25 to 100 litres will be required.

If, in the case of a breathing apparatus for aeroplane airmen, the pointer of the regulating valve $k$ is turned to the gas discharge figure 5, the apparatus will deliver 5 litres of oxygen per minute at an altitude of about 6000 metres. If the aeroplane rises to a height of 8000 metres, the delivery will be increased automatically to about 10 litres per minute. Similarly, when the aeroplane descends to lower altitudes such as 3000 metres, the quantity automatically delivered will be only that which is required at this height, viz 3 litres per minute. Thus the great advantage of the apparatus is chiefly that the areoplane or airship pilot needs only to set the valve $k$ once before starting out on his trip and that he will then receive the correct amount required at any height without paying any further attention to the valve.

I claim:

1. A device for supplying oxygen, comprising a double walled flask with the space between the walls evacuated and a pipe for conducting the liquid out of the inner vessel and around the neck thereof through a coil situated in the evacuated space around said neck.

2. In a device as claimed in claim 1, a passage joined to the said pipe and adapted to deliver the liquefied gas of the flask in a gaseous state.

3. In a device as claimed in claim 1, a passage joined to the said pipe and leading through evaporation vessels to a point of discharge where the liquefied gas is delivered at a temperature suitable for respiration or for enhancing the efficiency of a motor.

4. In a device as claimed in claim 1, an adjustable valve adjacent to the point of discharge of the vaporized liquid.

5. A device for supplying oxygen comprising an insulated flask for holding liquid oxygen, an adjustable throttling valve, evaporating passages for conducting oxygen in a liquid state out of the flask and in a gaseous state through the said throttling valve, a safety valve, and an evaporating passage leading from the flask to the said safety valve.

6. A device for supplying oxygen comprising a double-walled liquid oxygen flask with the space between the walls evacuated, an evaporating vessel, a tortuous pipe for conducting liquid oxygen from the flask to the evaporating vessel, an adjustable throttling valve, a tortuous pipe for conducting the oxygen from the evaporating vessel to the said throttling valve and adapted to warm the oxygen gas up to the temperature of the atmosphere, a safety valve, and a tortuous pipe for conducting oxygen from the said flask to the safety valve.

In testimony whereof I have signed this specification in the presence of two witnesses.

PAUL HEYLANDT.

Witnesses:
KATHE OESCH,
MAX JABLONSKI.